United States Patent [19]

Werner

[11] 4,385,743

[45] May 31, 1983

[54] FRAME FOR A LONGITUDINALLY AND HEIGHT-ADJUSTABLE VEHICLE SEAT

[75] Inventor: Paul Werner, Remscheid, Fed. Rep. of Germany

[73] Assignee: Keiper Automobiltechnik GmbH & Co. KG, Remscheid, Fed. Rep. of Germany

[21] Appl. No.: 174,135

[22] Filed: Jul. 31, 1980

[30] Foreign Application Priority Data

Aug. 16, 1979 [DE] Fed. Rep. of Germany ....... 2933092

[51] Int. Cl.³ .......................... A45D 19/04; B60H 1/00
[52] U.S. Cl. .................................... 248/393; 248/397; 297/328
[58] Field of Search ............... 248/397, 371, 393, 394, 248/395, 429, 398; 297/328, 327, 326, 329, 346

[56] References Cited

U.S. PATENT DOCUMENTS

| | | | |
|---|---|---|---|
| 290,841 | 12/1883 | Bohsert | 297/328 |
| 1,700,308 | 1/1929 | Chilson et al. | 248/429 |
| 1,759,922 | 5/1930 | Tempelton | 248/393 |
| 1,857,106 | 5/1932 | Bishop | 248/398 X |
| 2,036,529 | 4/1936 | Kindelberger et al. | 297/327 X |
| 2,594,882 | 4/1952 | De Rose | 248/394 |
| 3,335,995 | 8/1967 | Pickles | 248/394 |
| 3,643,604 | 2/1972 | Jones et al. | 248/397 |
| 3,712,573 | 1/1973 | Pickels | 248/394 |
| 3,819,142 | 6/1974 | De Fusco | 248/397 |
| 4,229,041 | 10/1980 | Werner | 248/393 X |

FOREIGN PATENT DOCUMENTS 853623 3/1940 France ................................ 297/329

*Primary Examiner*—James T. McCall
*Attorney, Agent, or Firm*—Wigman & Cohen

[57] ABSTRACT

The invention relates to a frame for a longitudinally and height-adjustable vehicle seat, having a bracket which is pivotable about a lateral axis. This frame is supported on the lateral axis and on respective height adjustment racks which are spaced from the lateral axis on either side of the seat and extend in the pivot direction thereof. The racks each mesh with respective gears of a height adjustment drive connected with the bracket. The frame also has guide rails in which respective runners are longitudinally guided, each of which, together with a longitudinal adjustment rack, forms a structural unit. Respective gears of a longitudinal adjustment drive, connected with the guide rails, engage these racks.

12 Claims, 6 Drawing Figures

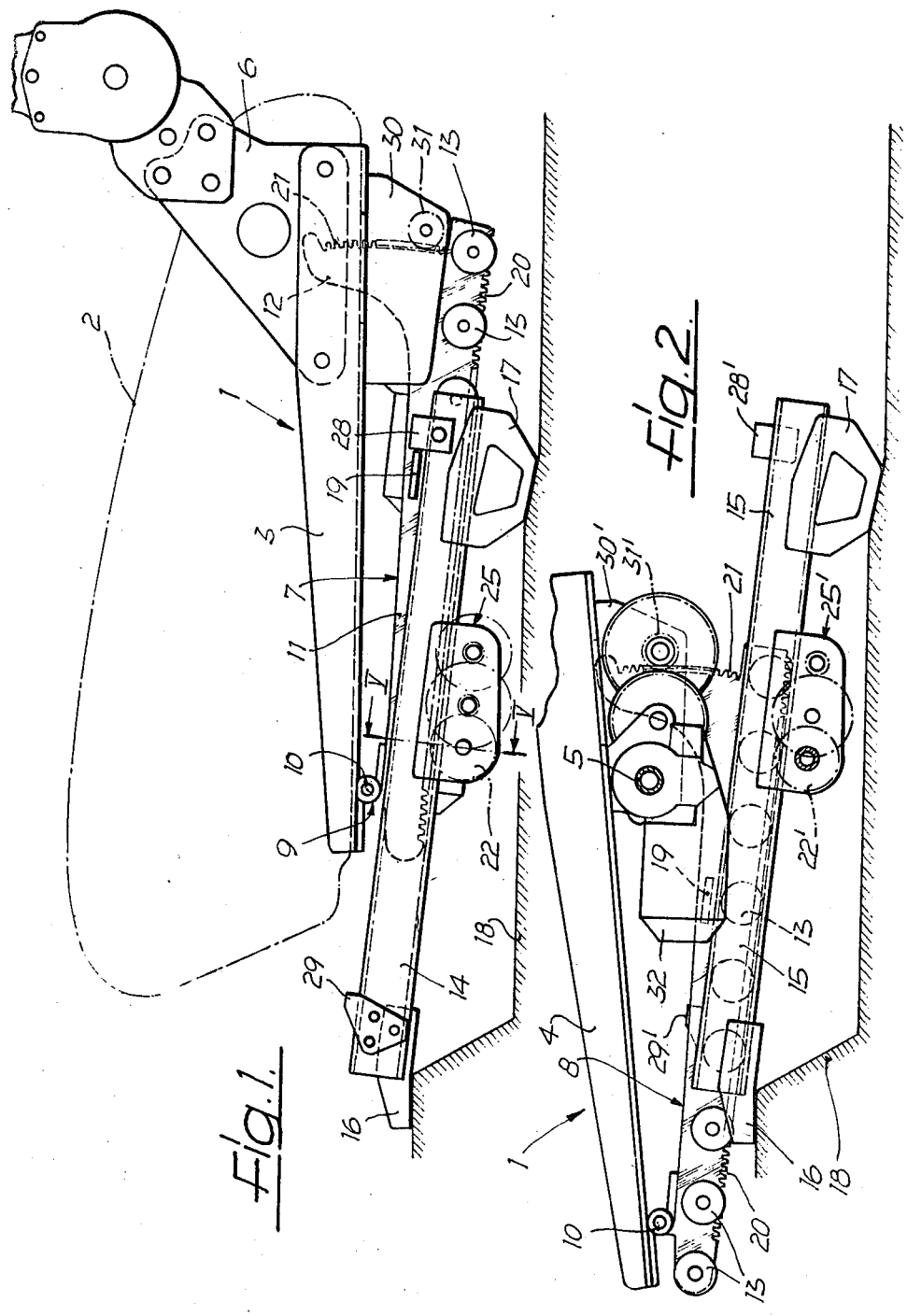

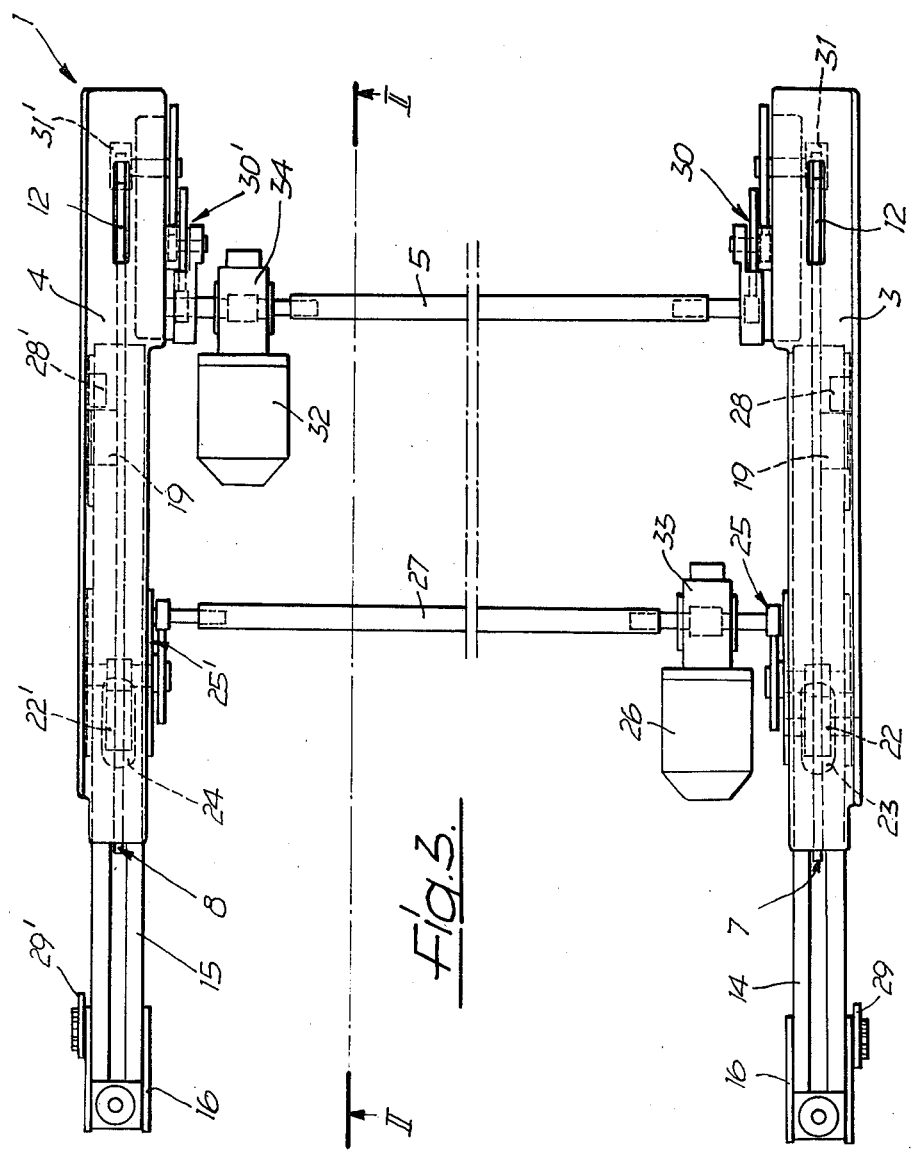

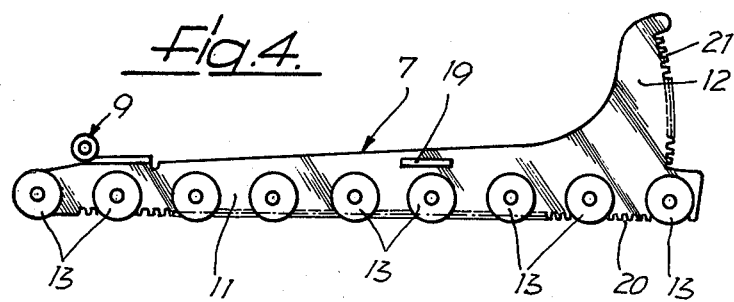
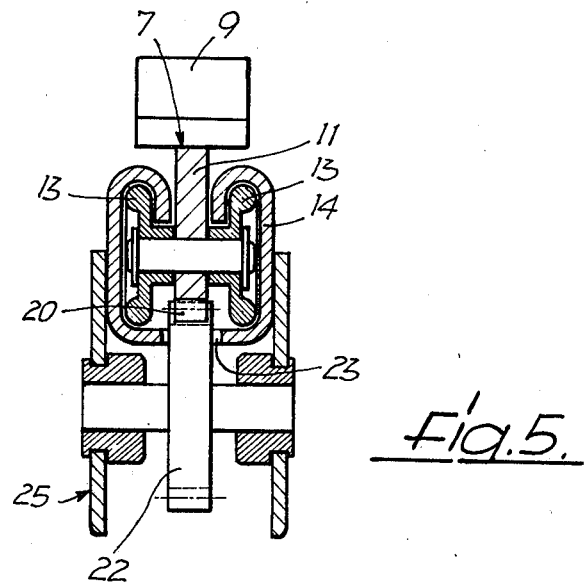

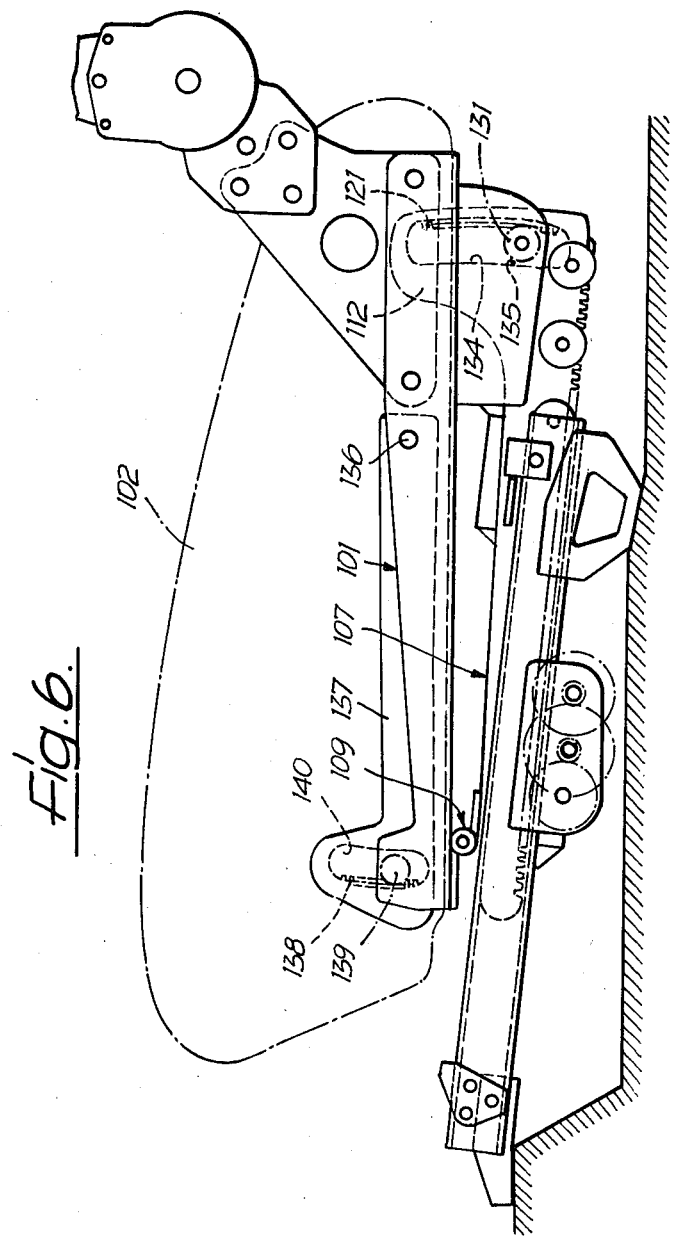

FRAME FOR A LONGITUDINALLY AND HEIGHT-ADJUSTABLE VEHICLE SEAT

BACKGROUND OF THE INVENTION

Known vehicle seat frames are quite complicated structurally, so that the manufacture of the frame is disadvantageously expensive.

SUMMARY OF THE INVENTION

The object of the invention is to create a frame of the type which has the simplest possible structure, thus making inexpensive manufacture possible.

In a frame, this object is achieved according to the invention. Each of the two runners and their associated height adjustment racks form a single structural unit. The bracket is hinged to the runners along the lateral axis and the two guide rails are elements of a lower portion which can be rigidly connected with the vehicle. The fact that the runners and their associated height adjustment racks form a single structural element which simultaneously forms a hinge point for the seat bracket makes it necessary to use only two main frame elements which are movable relative to the stationary guide rails in order to make possible independent longitudinal and height adjustment of the seat. This results in a desirable minimum expense for mounting and component manufacture, particularly, if in accordance with a preferred embodiment, each of the runners is formed in one piece with the height adjustment rack and the longitudinal adjustment rack. In this embodiment, the runners can be manufactured with the teeth of both racks as a stamped part in a single operational step.

BRIEF DESCRIPTION OF THE DRAWINGS

The invention will be described in greater detail below with the aid of two exemplary embodiments illustrated in the drawings.

In FIG. 1, there is shown a side view of a first exemplary embodiment of the frame in a position of adjustment in which the vehicle seat is moved completely back and down.

In FIG. 2, there is shown a partial section according to the section line II—II in FIG. 3, in which the first exemplary embodiment is shown in a position of adjustment in which the vehicle seat is raised and moved forward from the position shown in FIG. 1.

In FIG. 3, there is shown a side view of one of the runners of the first exemplary embodiment.

In FIG. 4, there is shown a side view of one of the runners of the first exemplary embodiment.

In FIG. 5, there is shown an enlarged section along the line V—V in FIG. 1.

In FIG. 6, there is shown a side view, corresponding to FIG. 1, of a second exemplary embodiment.

DETAILED DESCRIPTION OF THE PREFERRED EMBODIMENTS

FIGS. 1 and 3 show an exemplary embodiment of the vehicle seat frame including a bracket 1 which supports the seat portion of the vehicle seat, the upholstery 2 of which is indicated in FIG. 1 with a broken line. As can be recognized from FIGS. 1 and 3, the bracket 1 has longitudinal supports 3 and 4 on each side which are connected with each other by means of the seat portion of the vehicle seat (not shown in FIG. 3) as well as by means of drive shafts 5 and 27 (see FIG. 3) which are associated with height and longitudinal adjustment drives described in greater detail below. At each side of the seat near the rear ends of the longitudinal supports 3 and 4 of the bracket 1, there is also a fitting 6 of the backrest adjustment device of the seat.

The forward ends of the supports 3 and 4 of the bracket 1 are hinged to runners 7 and 8 with a pivot axis 10 running laterally to the longitudinal axis of the vehicle. One runner 7 is shown in FIG. 4. As FIG. 4 shows, a hinge joint 9 is attached to the upper forward edge of each runner. This hinge joint 9 is also attached to the associated longitudinal supports 3 and 4 of the bracket 1.

As illustrated in FIG. 4, the runner 7 has a long first arm 11 which forms the actual runner portion and at the rear end has a perpendicular shorter arm 12. Rollers 13 are rotatably mounted opposite each other and at equal distances on both sides of the longer arm 11 which serves as the actual runner. The runners 7 and 8 are guided in a longitudinally movable manner in associated guide rails 14 or 15 by means of these rollers 13. The shape of the guide rails 14 and 15, which in this regard are identical, is illustrated by example of the guide rail 14 in the cross-sectional view of FIG. 5. This FIG. 5 also shows the shape and pairing arrangement of the rollers 13 of the runner 7, which arrangement is identical to that of runner 8.

As FIGS. 1 and 2 show, the guide rails 14 and 15 are rigidly secured to the vehicle floor 18 by anchoring elements 16 and 17.

Except for the arrangement of a stop 19, the runners 7 and 8 are identical. It is thus sufficient to discuss only the runner 7 shown in FIG. 4. The stop 19 extends from the runner 7 as a laterally projecting flap from the left side of the longitudinal arm 11, relative to the direction of travel. In contrast, the stop 19 on the runner 8 extends laterally from the right side of the corresponding longitudinal arm 11, relative to the direction of travel. Gear teeth are formed on the underside of the longitudinal arm 11, serving as a longitudinal adjustment rack 20 and running in a straight line. Additional teeth are formed on the rear edge of the shorter arm 12, serving as a height adjustment rack 21, and having an arcuate shape whose center focal point is located in the center of the hinge 9 which forms the pivot axis and by means of which the bracket 1 is hinged to the runner 7. A pinion 22 or 22' meshes with the longitudinal adjustment rack 20 of each respective runner 7 and 8. Each pinion 22 and 22' passes partially through a lower slot opening 23 and 24 located in each of the guide rails 14 and 15. The pinions 22 and 22' each form a component of the drives 25 and 25' which are located approximately in the middle of the underside of the guide rails 14 and 15 and together with a drive motor 26 and a drive shaft 27 form the longitudinal adjustment drive. This longitudinal adjustment drive moves the runners 7 and 8 between the rearmost position shown in FIG. 1, where the movable stops 19 abut rigid rear stops 28 and 28' of the guide rails 14 and 15, respectively, and a forwardmost position, where the movable stops 19 releasably abut rigid front stops 29 or 29' arranged on the guide rails 14 and 15.

The height adjustment drive also includes two drive mechanisms 30 and 30' which are rigidly secured to the rear lower ends of the longitudinal supports 3 and 4, respectively, of the bracket 1, and each have a pinion 31 or 31' which meshes with the height adjustment racks 21 of the runners 7 and 8. The drives 30 and 30' are driven, similar to the case with the drives 25 and 25' of the longitudinal adjustment drive, by means of a drive motor 32 and the drive shaft 5 (see FIG. 3). The drive motors 26 and 32 are gear motors with built-in helical gearing, which acts to strongly reduce rpms and is also self-braking. The drive motors 26 and 32 can be driven independently of one another, so that an independent movement of the runners 7 and 8 can take place in the guide rails 14 or 15, as can an independent adjustment of the height and the angle of inclination of the bracket.

As stated above, FIGS. 1 and 3 show the position where the runners 7 and 8 are moved completely rearward and the bracket 1 is in its lowest position, in which the pinions 31 and 31' assume their lowermost position on the rack 21. FIG. 2, in contrast, shows a position of adjustment in which the bracket 1 is raised, but not to its highest possible position. As can be seen in FIG. 2, the pinion 31' is located approximately in the upper third of the rack 21, whereby the height adjustment drive has raised the bracket 1, together with the drive motor 32, drives 30 and 30', and drive shaft 5, above the plane of the guide rails 14 and 15. Furthermore, in FIG. 2, the runners 7 and 8 have been moved forward relative to the position thereof in FIG. 1, whereby, however, the forwardmost position has not been reached. In such forwardmost position, the movable stops 19 would abut the front stops 29 and 29' of the guide rails 14 and 15, respectively.

The second exemplary embodiment shown in FIG. 6 largely corresponds with the embodiment according to FIGS. 1 through 5. For this reason, corresponding elements are designated with reference numerals which are larger by 100, and only the differences will be discussed. To the extent the structure of the second embodiment is not described below, it corresponds to that of the first embodiment.

As FIG. 6 shows, the shorter arm 112 of each runner 107 is provided with a slot-like opening 134 which extends in the shape of an arc, the center focal point of which corresponds with the pivot axis formed by the hinge 109. The edge of the opening 134, which is quite far from the hinge 104, is provided with gear teeth which form the height adjustment rack 121. The pinion 131 meshes with the rack 121 shown in FIG. 6. A slot 135 is located between the pinion and the edge of the opening 132 lying closest to the hinge 109, and the width of this slot 135 is less than the height of the teeth of the pinion 131 and the rack 121.

In order to be able to adjust the forward portion of the upholstery 102 independently of the rear portion thereof, an upholstery support 137 is mounted in the bracket 101 so as to be pivotable about an axis 136 which runs parallel to the pivot axis defined by the hinge 109 and lies in the rear half of the bracket 101. The upholstery support 137, on which the upholstery 102 rests, has at both sides of the seat at its forward end an opening 140 extending in the pivot direction. The edge of this opening 140 furthest removed from the axis 136 lies on an arc and is provided with teeth which form a rack 138. A pinion 139 of an otherwise unillustrated drive mechanism meshes with this rack 138. This drive mechanism is formed similarly to that of the pinion 131, except that it is connected to the bracket 101. A rotation of the pinion 139 in one direction leads to a clockwise pivoting movement of the upholstery support 137 while a rotation in the opposite direction leads to a counterclockwise pivoting movement about the axis 136. In this manner, the forward portion of the upholstery 102 is raised and lowered.

These embodiments of the invention are considered illustrative only. Other modifications will readily occur to those skilled in the pertinent technology. However, such modifications must be deemed within the scope and spirit of the appended claims.

What I claim is:

1. A frame for a seat in a vehicle, comprising:
    bracket means for carrying the seat;
    joint means for hinging the bracket means for pivotable movement about an axis running laterally under the seat;
    runner means, connected to the joint means, for extending longitudinally under the seat;
    rail means for guiding linear movement of the runner means therein;
    rack means for adjusting the rearward height of the seat, said rearward height adjusting rack means forming unitary structural components with their associated runner means; and
    means for anchoring the rail means to a floor of the vehicle.

2. A frame for a seat in a vehicle, comprising:
    bracket means for carrying the seat;
    joint means for hinging the bracket means for pivotable movement about an axis running laterally under the seat;
    runner means, connected to the joint means, for extending longitudinally under the seat;
    rail means for guiding linear movement of the runner means therein;
    rack means for adjusting the rearward height of the seat, said rearward height adjusting rack means forming unitary structural components with their associated runner means;
    means for anchoring the rail means to a floor of the vehicle; and
    rack means for adjusting the longitudinal position of the seat, said longitudinal position adjusting rack means forming unitary structural components with their associated runner means and their associated rearward height adjusting rack means.

3. A frame for a seat in a vehicle, comprising:
    bracket means for carrying the seat;
    joint means for hinging the bracket means for pivotable movement about an axis running laterally under the seat;
    runner means, connected to the joint means, for extending longitudinally under the seat;
    rail means for guiding linear movement of the runner means therein;
    rack means for adjusting the rearward height of the seat, said rearward height adjusting rack means forming unitary structural components with their associated runner means;
    means for anchoring the rail means to a floor of the vehicle; and
    said rearward height adjusting rack means are lying in the same plane but forming an angle with their associated runner means.

4. The frame according to claim 1, wherein:
    each of said rearward height adjusting rack means has a toothed edge.

5. The frame according to claim 4, further comprising:
    pinion gear means for traveling along said toothed edges.

6. A frame for a seat in a vehicle, comprising:
bracket means for carrying the seat;
joint means for hinging the bracket means for pivotable movement about an axis running laterally under the seat;
runner means, connected to the joint means, for extending longitudinally under the seat;
rail means for guiding linear movement of the runner means therein;
rack means for adjusting the rearward height of the seat, said rearward height adjusting rack means forming unitary structural components with their associated runner means;
means for anchoring the rail means to a floor of the vehicle;
each of said rearward height adjusting rack means has a toothed edge;
pinion gear means for traveling along said toothed edges; and
said pinion gear means travels in a slot-like opening in each of said rearward height adjusting rack means, said slot-like opening having another edge opposite from and substantially parallel to said toothed edge.

7. A frame for a seat in a vehicle, comprising:
bracket means for carrying the seat;
joint means for hinging the bracket means for pivotable movement about an axis running laterally under the seat;
runner means, connected to the joint means, for extending longitudinally under the seat;
rail means for guiding linear movement of the runner means therein;
rack means for adjusting the rearward height of the seat, said rearward height adjusting rack means forming unitary structural components with their associated runner means;
means for anchoring the rail means to a floor of the vehicle; and
roller means mounted on each runner means and spaced along the longitudinal length thereof, for moving said runner means linearly in said rail means.

8. The frame according to claim 7, wherein:
said roller means are arranged in pairs and their associated runner means are disposed between the two roller means of each pair.

9. The frame according to claim 7, wherein:
said roller means are overlapped by edges of said rail means.

10. The frame according to claim 1, further comprising:
support means for resting the seat therebetween;
joint means for hinging the support means for pivotable movement about an axis running laterally in a rear half of the bracket means;
rack means for adjusting the frontward height of the seat, said frontward height adjusting rack means being supported on the bracket means; and
pinion gear means for meshing with said frontward height adjusting rack means.

11. A frame for a seat in a vehicle, comprising:
bracket means for carrying the seat;
joint means for hinging the bracket means for pivotable movement about an axis running laterally under the seat;
runner means, connected to the joint means, for extending longitudinally under the seat;
rail means for guiding linear movement of the runner means therein;
rack means for adjusting the rearward height of the seat, said rearward height adjusting rack means forming unitary structural components with their associated runner means;
means for anchoring the rail means to a floor of the vehicle;
support means for resting the seat therebetween;
joint means for hinging the support means for pivotable movement about an axis running laterally in a rear half of the bracket means;
rack means for adjusting the frontward height of the seat, said frontward height adjusting rack means being supported on the bracket means;
pinion gear means for meshing with said frontward height adjusting rack means; and
each of said frontward height adjusting rack means has a slot-like opening provided with a toothed edge and said pinion gear means travels along said toothed edge.

12. The frame according to claim 6, wherein:
a slot is present between said pinion gear means and said another edge, said slot having a width which is smaller than the height of teeth on the toothed edge.

* * * * *